Feb. 10, 1953      B. A. SARD      2,628,191
REGENERATION OF ION EXCHANGERS
Filed Feb. 18, 1948      2 SHEETS—SHEET 1

INVENTOR
BERNARD ABEL SARD
BY
Clarence D. Kerr
ATTORNEY

Feb. 10, 1953 B. A. SARD 2,628,191
REGENERATION OF ION EXCHANGERS
Filed Feb. 18, 1948 2 SHEETS—SHEET 2

INVENTOR
BERNARD ABEL SARD
BY
Clarence D. Kerr
ATTORNEY

Patented Feb. 10, 1953

2,628,191

UNITED STATES PATENT OFFICE 2,628,191

REGENERATION OF ION EXCHANGERS

Bernard Abel Sard, Osterley, England, assignor to The Permutit Company, New York, N. Y., a corporation of Delaware Application February 18, 1948, Serial No. 9,302
In Great Britain October 29, 1946

Section 1, Public Law 690, August 8, 1946
Patent expires October 29, 1966

11 Claims. (Cl. 210—24)

This invention relates to the regeneration of a bed of cation exchange material used for the treatment of liquids containing dissolved cations. More particularly, the invention is concerned with a process and apparatus for determining when a bed of cation exchange material charged with exchangeable hydrogen ions becomes exhausted in its normal operation so that regeneration is required.

The treatment of liquids containing dissolved cations, such as water containing sodium, calcium, magnesium and similar cations, with a cation exchange material known as a hydrogen ion exchanger, has been used for some time. The exchange materials used in this so-called hydrogen cycle are organic materials, granular in form, which are regenerated from time to time, as may be necessary, with an acid solution. After regeneration with the acid, the cation exchange material removes sodium, calcium and magnesium ions from water passed through a bed of the material, giving up hydrogen ions to the water in place of the metallic cations removed. Eventually, however, the cation exchange material becomes exhausted, and at this point it has to be regenerated again. During the regeneration stage, the acid is introduced into the bed of material for regeneration, then washed out, and the flow of water to be treated through the bed is again started.

It is difficult, however, to determine with exactness the point during the working part of the cycle when the exchange material becomes sufficiently exhausted to require regeneration with the acid. Two main methods used heretofore for this purpose involve either periodic chemical testing of the effluent from the bed of exchange material, or the passage of a predetermined quantity of the water or other liquid undergoing treatment. Neither one of these methods is completely satisfactory. If chemical testing of the effluent is used, it is necessary to make successive determinations of the acidity of the effluent and determine the point of the working stage at which a rapid fall of acidity from the normal value occurs. This method is not only somewhat cumbersome for practical operation, but also may give some confusing results because the acidity of the effluent is dependent, to some extent at least, upon the cation content of the raw water or other liquid undergoing treatment. Thus, a fall in the acidity of the effluent may indicate exhaustion of the cation exchange material, or it may simply indicate a variation in the cation content of the raw liquid introduced into the cation exchange material.

The method of regeneration based upon passage of a predetermined quantity of liquid undergoing treatment is likewise not entirely satisfactory, because in this case an adequate safety factor or margin must be allowed to take care of any variation in the cation content of the raw liquid entering the exchanger. Consequently, this method frequently results in the incomplete use of the full exchange capacity of the cation exchange material and, therefore, more frequent regeneration using more regenerating acid than is necessary.

One object of this invention is to provide a process and apparatus by which these disadvantages can be overcome and the end point of the working stage determined simply and accurately, regardless of fluctuations in the cation content of the raw liquid undergoing treatment.

A further object of this invention is to determine the end point of the working stage of such a cation exchange material by comparing the electrical conductivity of the effluent from the bed of exchange material with the electrical conductivity of a portion of the effluent that has been passed through a different quantity of the exchange material.

The invention will be better understood by reference to the accompanying drawings, in which Figure 1 is a graph of the acidity of the effluent plotted against time during the working stage of a hydrogen ion exchange material used to treat water of constant cation content at a steady rate.

Figure 1:
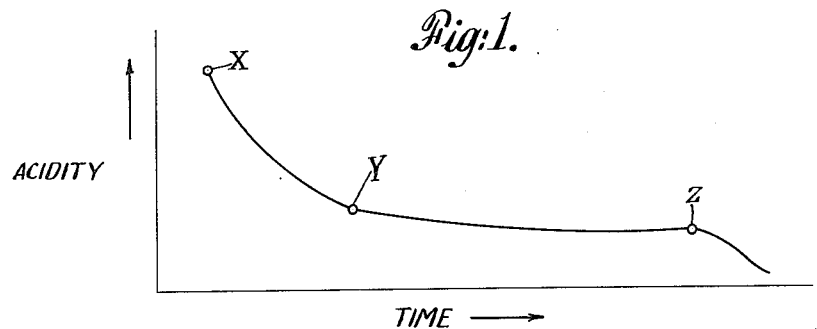

If, after a bed of cation exchange material is regenerated acid, water of constant composition is passed through the bed at a steady rate and the acidity of the effluent is plotted against time, a curve of the form shown in Figure 1 is obtained. As the water is first passed through the bed the effluent has a rather high acidity, as indicated at the point X, and drops rather sharply to the point Y as some free acid left in the bed is gradually washed out. The acidity then changes only very slowly during the operation of the exchanger as shown by the curve between the points Y and Z, and is dependent upon the original cation content associated with the anions of strong acids in the raw water undergoing treatment. At the point Z, however, the cation exchange material becomes exhausted, for practical purposes, and if the flow of water is continued, the acidity of the effluent thereafter falls rapidly until it becomes zero. In fact, if the raw water undergoing treatment is alkaline, alkalinity will appear in the effluent and gradually increase until it reaches the same value as that of the raw liquid entering the cation exchanger.

In accordance with my invention, the point Z on this curve is determined readily and simply by comparing the electrical conductivity of the effluent from the exchange unit with the electrical conductivity of a sample of the effluent subjected to a different quantity of hydrogen ion exchange material. This portion of the effluent used for comparison may be a portion of the effluent from the unit passed through an auxiliary hydrogen ion exchanger. A comparison is thus provided between two samples of treated water containing at the exhaustion point different quantities of hydrogen ions and, therefore, different quantities of metallic cations. Since the equivalent conductance of hydrogen ions is much greater than the equivalent conductance of metallic cations, these two samples, at this stage, would have substantially different electrical conductivities or resistances, even though the sum of the hydrogen and metallic cations in the samples is not changed. Before the point Z is reached on the curve in Figure 1, both samples will contain approximately the same quantity of hydrogen ions and therefore have approximately the same electrical conductivity.

Such a procedure may be employed in a plant employing single cation exchange units, or in a plant in which two or more containers are filled with cation exchange material and connected either in series or in parallel.

When an auxiliary cation exchanger is employed, it is used only for test purposes and therefore may be made of relatively small size and receive only a small part of the effluent from the main cation exchange unit. The effluent from this auxiliary unit may be mixed with the main effluent from the main exchange unit as it goes to storage or service, or it may be run to waste.

Figure 2:
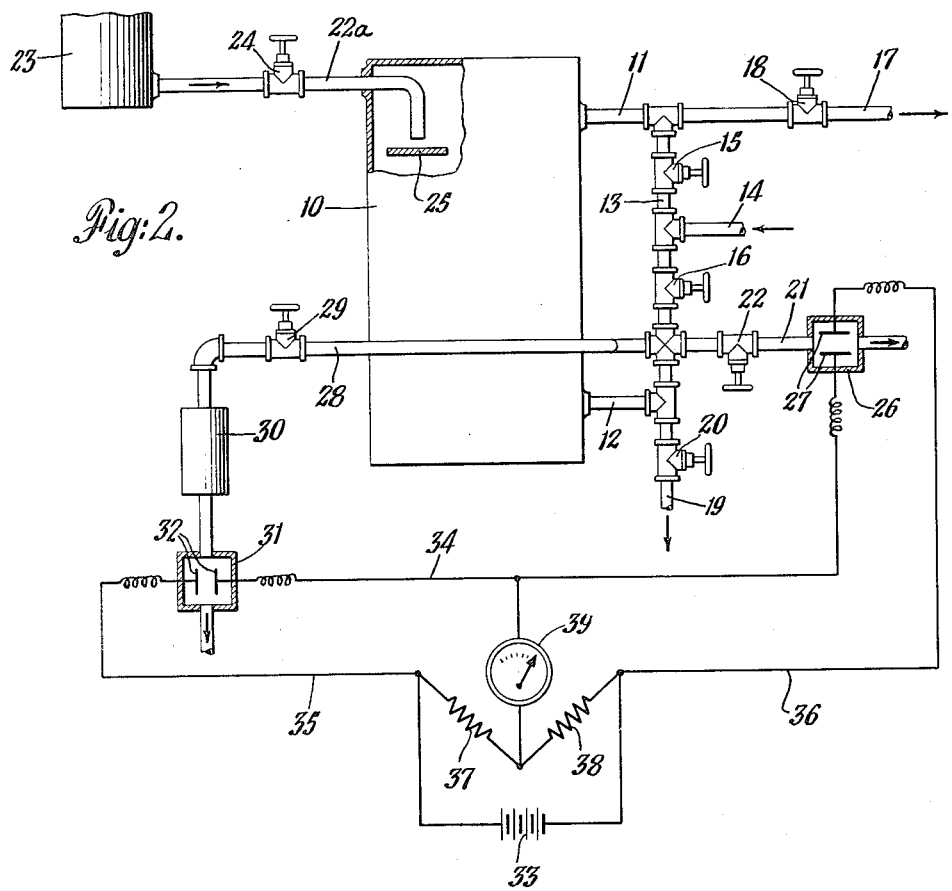
Figure 2 is a schematic illustration of a hydrogen ion exchange unit equipped to determine the end point of the working stage in accordance with my invention.

One suitable arrangement for operation in accordance with my invention is shown in Figure 2, in which a container or tank 10 is provided with a bed of suitable depth of organic cation exchange material. This tank is provided with pipes 11 and 12 for the introduction or withdrawal of liquid, and pipes 11 and 12 are connected together outside the tank by the pipe 13 which in turn is connected to the inlet 14 for the raw water to be treated. Valves 15 and 16 in the pipe 13 permit raw water from the inlet 14 to be introduced either into the lower part of the tank for backwashing, or into the upper part of the tank for the ion exchange treatment. Pipe 11 is preferably provided with an extension 17 having a suitable valve 18 through which liquid can be run to waste. The lower end of pipe 13 may likewise be provided with an extension 19 and a suitable valve 20 through which residual free acid and wash water may be run to waste.

The water which has been treated passes through the pipe 21 controlled by valve 22 and thence to service or storage, as may be desired. The tank 10 is also provided with an inlet 22a for the regenerating acid from tank 23, the introduction of which is controlled by the valve 24 and distributed over the cation exchange material inside the tank by a baffle plate or diffuser 25.

In accordance with my invention, the normal effluent passing to service through the outlet 21 passes through a chamber 26 fitted with a pair of electrodes 27. Also, a portion of the effluent is by-passed from the main outlet through the pipe 28 under control of valve 29 through a small auxiliary hydrogen ion exchanger 30 and thence through a chamber 31 between the electrodes 32 and either run to waste or combined with the effluent from the outlet 21.

The pairs of electrodes 27 and 32 with the liquid flowing between them constitute variable resistances which are connected electrically in series with each other and with a source of potential, such as a battery 33, by the wires 34, 35 and 36. A pair of fixed resistances 37 and 38 are connected in series with each other across the battery 33, and a galvanometer or other similar instrument 39 is connected across the system between the resistances 37 and 38 and the electrodes 27 and 32, thus providing a Wheatstone bridge.

In the operation of this device, the exchange material in the tank 10 and in the auxiliary exchange unit 30, after being regenerated with acid, is used to remove metallic cations from water. The normal effluent from this tank, which has virtually all of its metallic cations removed and contains hydrogen ions in place thereof, passes between the electrodes 27 and creates a resistance at this point of a given value. A portion of this effluent is withdrawn through the pipe 28 and passed through the exchanger 30 which does not alter the chemical composition of the water substantially at this stage, so that the effluent from the auxiliary exchanger 30 when passed between the electrodes 32 creates a resistance approximately equal to the resistance between the electrodes 27. Thus, if the resistances 37 and 38 are also balanced with respect to each other, the needle of the galvanometer 39 will not be deflected in either direction.

This condition will be maintained regardless of normal fluctuations in metallic cation content of the raw water undergoing treatment because the two effluents from the tank 10 and the auxiliary exchanger 30 will have substantially the same resistance as each other as long as the exchange material in the tank 10 is performing its proper function. However, as soon as the effluent from the tank 10 begins to contain quantities of metallic cations which have not been converted to hydrogen ions, the resistance between the electrodes 27 will become somewhat lower and a sample of this water passed through the auxiliary exchanger 30 will then contain a higher hydrogen ion content with consequent less resistance between the electrodes 32. As this occurs, the needle of the galvanometer 39 will swing over from the neutral position indicating that the exchange material in the tank 10 needs regeneration.

At this stage, the flow of raw water to the unit is shut off by closing the valves 15, 22 and 29, and the valves 18 and 16 are opened to backwash the exchange material in the tank 10. When the material has been backwashed and loosened sufficiently, the valves 18 and 16 are closed, and acid is introduced into the tank 10 by opening the valve 24. Normally this acid would be run to waste by simply opening the valve 20, but in this case it may be desirable to use some of the waste acid to regenerate the exchange material in the auxiliary exchanger 30. Consequently, the valve 29 is opened to pass part of the acid through the exchanger 30 and the material in both exchange units is then washed by opening the valve 15. Valve 20 may be opened sufficiently to run to waste the acid and wash water that is not needed for passage through the exchanger 30. After sufficient washing has taken place, the valve 20 is closed, and the valves 22 and 29 are opened to start the next working stage.

It is also possible, as will be apparent to those skilled in the art, to utilize this process and apparatus for performing the regeneration of the unit automatically. In the arrangement shown in Figure 3, the reference numerals applied indicate the same parts as those indicated and described in connection with Figure 2. The apparatus is essentially the same except that all of the valves are operated by either motors or solenoids, and the galvanometer is of the limit contact type, so that when the needle of the ordinary galvanometer would be deflected a certain distance, the contacts of the galvanometer 40 are closed completing a circuit to the coil of the solenoid 41, which in turn closes the switch 42 and starts the motor 43 driving the sequence timer 44. The sequence timer 44 supplies power through the pairs of conductors 45 to the various valves described in connection with Figure 2 in the proper sequence to perform the operations of backwashing, regeneration with acid, washing and restoring the working stage automatically.

Figure 3:
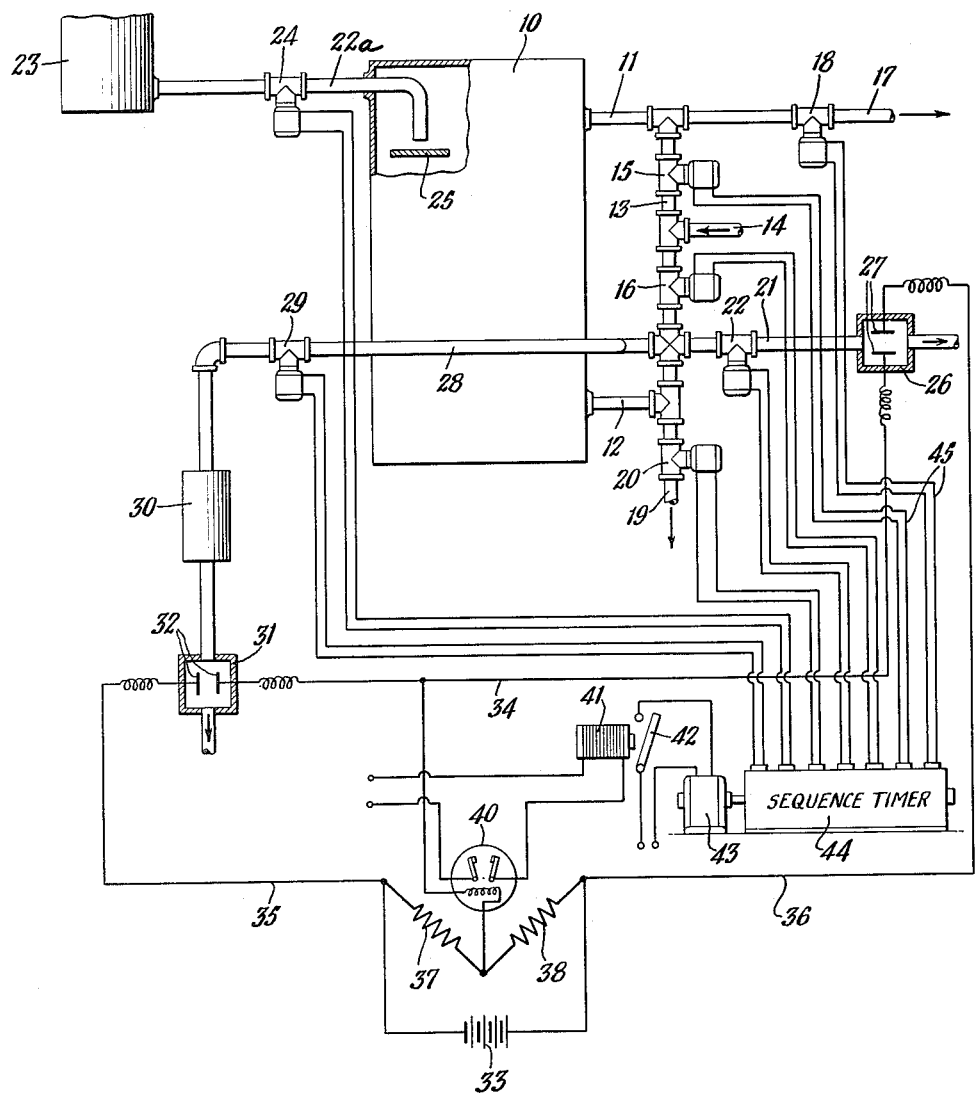
Figure 3 is a schematic illustration of a hydrogen ion exchange unit equipped to determine the end point of the working stage and initiate automatically the regeneration of the ion exchange material.

It will also be apparent that while Figure 3 indicates one type of automatic regeneration, the same principle may readily be employed to initiate automatic regeneration performed by a single motor driven multi-port valve or by various other means, as will be readily understood by those skilled in the art.

A Wheatstone bridge has been described as one method and means for comparing the resistance or the conductivity of the effluent from the main exchange unit 10 with the effluent from the auxiliary exchange unit 30. However, any other suitable electrical instruments or system may be used either to measure or compare the electrical conductivities or resistances of the two samples of effluent.

Also, it will be apparent that if two hydrogen ion exchangers are connected to operate in series, the effluent from the second exchanger in the series may be used for the comparison instead of the effluent from a separate auxiliary exchanger.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A process of determining when to regenerate a hydrogen ion exchanger which comprises by-passing a portion of the effluent from the exchanger through a small auxiliary hydrogen ion exchanger, measuring the conductivities of the effluents from said exchangers, and regenerating said first exchanger when said conductivities become substantially different from each other.

2. Apparatus for determining when to regenerate a hydrogen ion exchanger which comprises means for measuring the electrical conductivities of the effluent from the exchanger and of a sample of said effluent which has been passed through a different quantity of the hydrogen ion exchange material, and means for indicating when these conductivities become substantially different from each other.

3. Apparatus for determining when to regenerate a hydrogen ion exchanger which comprises means for measuring the electrical conductivities of the effluent from the exchanger and of a sample of said effluent which has been passed through a different quantity of the hydrogen ion exchange material, and means for initiating regeneration of the exchanger when the conductivities become substantially different from each other.

4. Apparatus for determining when to regenerate a hydrogen ion exchanger which comprises means for measuring the electrical conductivities of the effluent from the exchanger and of a sample of the same effluent which has been passed through an additional quantity of fully regenerated hydrogen ion exchange material, and means for indicating when these conductivities become substantially different from each other.

5. Apparatus for determining when to regenerate a hyrogen ion exchanger which comprises means for measuring the electrical conductivities of the effluent from the exchanger and of a sample of the same effluent which has been passed through an additional quantity of fully regenerated hydrogen ion exchange material, and means for initiating regeneration of the exchanger when the conductivities become substantially different from each other.

6. In combination with a hydrogen ion exchanger, two pairs of electrodes connected to form balancing resistors in a Wheatstone bridge, means for passing the effluent from the exchanger between one pair of electrodes, and means for passing between the other pair of electrodes a sample of the same effluent which has been subjected to the action of a different quantity of the hydrogen ion exchange material.

7. In combination with a hydrogen ion exchanger, two pairs of electrodes connected to form balancing resistors in a Wheatstone bridge, means for passing the effluent from the exchanger between one pair of electrodes, and means for passing between the other pair of electrodes a sample of said effluent after it has been passed through an additonal quantity of fully regenerated hydrogen ion exchange material.

8. In combination with a hydrogen ion exchanger, two pairs of electrodes connected to form balancing resistors in a Wheatstone bridge, means for passing the effluent from the exchanger between one pair of electrodes, means for passing between the other pair of electrodes a sample of said effluent which has been subjected to the action of a different quantity of the hydrogen ion exchange material, and means for initiating regeneration of the exchanger when the resistances between said pair of electrodes become substantially different from each other.

9. In combination with a main hydrogen ion exchanger, an auxiliary hydrogen ion exchanger, means for by-passing part of the effluent from said main exchanger through said auxiliary exchanger, and means for measuring and comparing the electrical conductivities of the effluents from the two exchangers.

10. A process of operating a hydrogen ion exchanger in which a liquid is flowed through a bed of exchange material which comprises passing the liquid through a fixed quantity of the exchange material, measuring the conductivity of the liquid thus obtained, passing at least a portion of said treated liquid through an additional quantity of the exchange material, measuring the conductivity of the liquid after such additional treatment, and regenerating the bed when the conductivities thus measured become substantially different from each other.

11. A process of operating a hydrogen ion exchanger containing a bed of cation exchange material which comprises measuring the conductivity of the effluent from said exchanger, passing at least a portion of the effluent through a second bed of said cation exchange material, and regenerating both of said beds when the two conductivities thus measured differ substantially from each other.

BERNARD ABEL SARD.

REFERENCES CITED

The following references are of record in the file of this patent:

UNITED STATES PATENTS

| Number | Name | Date |
|---|---|---|
| 1,928,384 | McCanna | Sept. 26, 1933 |
| 2,209,487 | Wagner | July 30, 1940 |

FOREIGN PATENTS

| Number | Country | Date |
|---|---|---|
| 569,660 | Great Britain | June 4, 1945 |